United States Patent [19]

Carmody et al.

[11] Patent Number: 4,932,241
[45] Date of Patent: Jun. 12, 1990

[54] REUSABLE PLUMBING TEST PIPE

[76] Inventors: Thurman J. Carmody, 3305 Oakridge Rd., Omaha, Nebr. 68112; Arthur D. McWilliams, 6909 Ogden, Omaha, Nebr. 68104; James S. Bauer, 12418 Glenvale Plz., Omaha, Nebr. 68164

[21] Appl. No.: 354,706

[22] Filed: May 22, 1989

[51] Int. Cl.⁵ ............................................. G01M 3/28
[52] U.S. Cl. ...................................... 73/49.8; 138/90
[58] Field of Search ...................... 73/498, 46, 40.5 R; 138/90

[56] References Cited

U.S. PATENT DOCUMENTS 3,941,156  3/1976  Metzger ................................. 138/90
4,542,642  9/1985  Tagliarino ......................... 73/49.8 X

*Primary Examiner*—John Chapman
*Assistant Examiner*—Joseph W. Roskos
*Attorney, Agent, or Firm*—John A. Beehner

[57] ABSTRACT

A test pipe for pressure testing piping systems includes an elongated main pipe section having top and bottom end portions and an internal closure preventing fluid flow therethrough. A valved first port in communication with the top end portion enables the test portion of the system to be filled from the bottom upon connection to a pressurized fluid source. Upon pressurization of the system, a pressure gauge in communication with the top end portion will indicate any pressure reductions due to system leaks. Upon successful testing, the valve first port is connected by a bypass hose to a second port in communication with the bottom end portion for drainage of fluid from the test portion to the piping system directly below the test pipe.

14 Claims, 4 Drawing Sheets

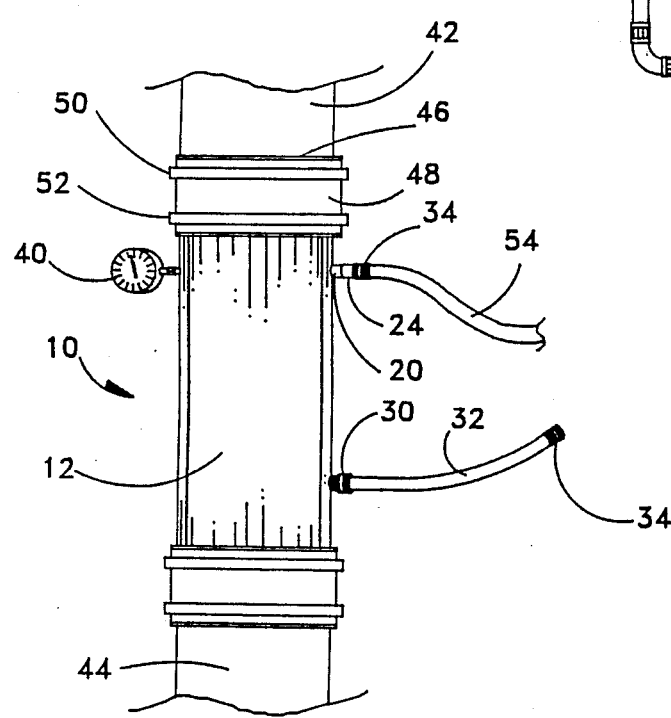
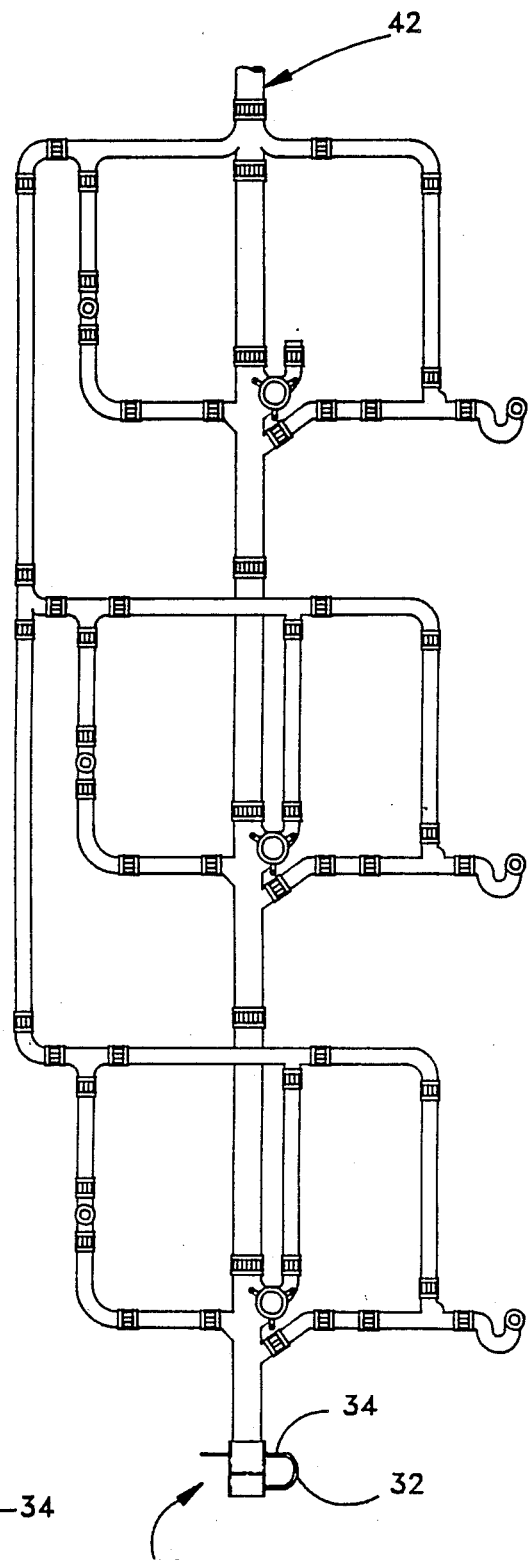
FIG. 6
FIG. 5

REUSABLE PLUMBING TEST PIPE

BACKGROUND OF THE INVENTION

The present invention is directed generally to a test pipe for multi-story plumbing systems and more particularly to an improved test pipe which substantially simplifies pressure testing of a multiple story test portion of a piping system and which eliminates the safety hazards associated with the use of known test pipes.

One of the biggest problems for a commercial plumbing contractor is pressure testing of the installed piping system. It has heretofore involved a time-consuming, dirty and often hazardous operation.

Building codes generally require that the plumbing systems of multi-story buildings be pressure tested either by an air test or a water test. Typically, this is done at the base of a test portion of the system where a short section of pipe is removed and replaced with a Y-joint. A preformed inflatable rubber balloon was inserted into the upper pipe after which an air pump or pressurized air tank was connected to the balloon valve for inflating it to block fluid flow through the test pipe. A hose was then dragged to the open top end of the test portion of the system for filling it with water. Substantial pressure was exerted against the balloon during a visual inspection of the system for detection of leaks. The balloons were known to rupture, causing substantial flooding of water rushing from the Y-joint and resulting damage to the building for which the plumbing contractor may be responsible. Furthermore, hands and fingers of plumbers have been broken while attempting to remove the inflated balloons from the high pressure systems. Over inflation can cause the balloons to burst while under inflation will prevent the balloon from holding the pressure in the system. The balloon retention chain can break allowing the balloon to be driven into the system by the pressurized fluid to cause blockage downstream.

Metzger, U.S. Pat. No. 3,941,156, disclosed a plumbing test fitting which eliminated the inflatable balloon by providing a test fitting with a closure plate extended thereacross and a valve drain port in communication with the test pipe chamber above the closure plate. A hose could be connected to the valved port for draining fluid from the system to a closet fixture on the lower of the next-adjacent floors. Whereas use of the Metzger test fitting eliminated much of the danger associated with the balloon-type test inserts, several problems remained. Filling the test portion from the top and visual inspection for leaks required much time and labor for the testing operation. Drainage of the test fluid was similarly a problem in that the drain hose had to reach and be carried to a closet fixture or other access opening to the plumbing system on the next adjacent lower floor of the building.

A primary object of the present invention, therefore, is to provide an improved plumbing test pipe.

Another object is to provide a test pipe which enables filling, monitoring, and draining of the test portion of the piping system from the location of the test pipe.

Another object is to provide such a test pipe which enables a multi-story test portion of a piping system to be quickly and easily pressure tested.

Another object is to provide such a test pipe which is safely installed and operated for testing up to five story test portions of piping systems.

Another object is to provide a test pipe equipped with a pressure gauge for affording a visual indication at the test pipe, of system leaks.

Another object is to provide a test pipe which is simple and rugged in construction, inexpensive to manufacture and efficient in operation.

Another object is to provide an improved method for pressure testing multi-story test portions of a piping system with the test pipe of the invention.

SUMMARY OF THE INVENTION

The test pipe of the invention includes a short elongated main pipe section adapted to replace a short pipe section at the base of a test portion of a piping system. The main pipe section is coupled to the piping system by conventional seal rings and clamps. A closure plate across the inside diameter of the main pipe section prevents fluid flow through the main pipe section between the top and bottom end portions.

To fill and drain fluid from the test portion, a first port opens through the top end portion. A second port through the bottom end portion provides for drainage back into the system of fluid drained from the system through the upper first port. A valve means is provided on the first port, preferably in the form of a quick-disconnect coupling to enable fast efficient use of the test pipe. A bypass drainage hose has a standard female hose connection on one end for connection to the second port and a quick-disconnect fitting on the opposite end for releasable connection to the quick-disconnect coupling at the first port. A third port opening through the top end portion has a fluid pressure gauge installed therein for measuring pressure within the top end portion.

Pressure testing with the test pipe of the invention is easily accomplished by installing the test pipe at the base of a test portion of the system, connecting a source of pressurized air or water to the quick-disconnect coupling and filling the system with fluid and monitoring the pressure gauge to detect any pressure losses due to leaks. Upon satisfactory testing of the system, the source of pressurized fluid is easily disconnected from the first port whereupon the quick-disconnect fitting on the freeend of the bypass hose is snap fit onto the quick-disconnect coupling of the first port enabling drainage of fluid from the test portion of the piping system past the test pipe closure plate. Thus, a multi-story portion of a piping system can be quickly and easily pressure tested by a single plumber from the location of the test pipe installation.

BRIEF DESCRIPTION OF THE DRAWINGS

FIG. 5 is a partial elevational view of a multi-story test portion of a plumbing system; and FIG. 6 is a partial elevational view of the test pipe installed in the piping system.

DESCRIPTION OF THE PREFERRED EMBODIMENT

Figure 1:
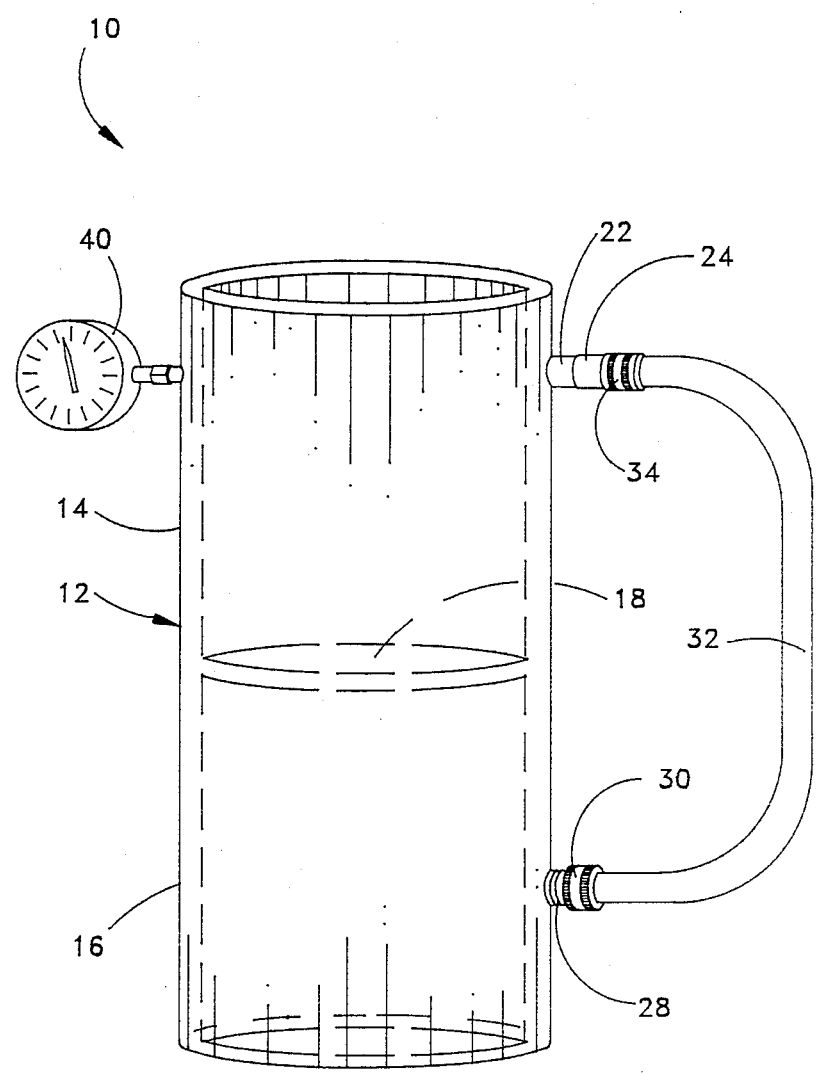
FIG. 1 is a perspective view of the test pipe of the invention with dotted lines indicating the internal closure plate thereof.
Figure 2:
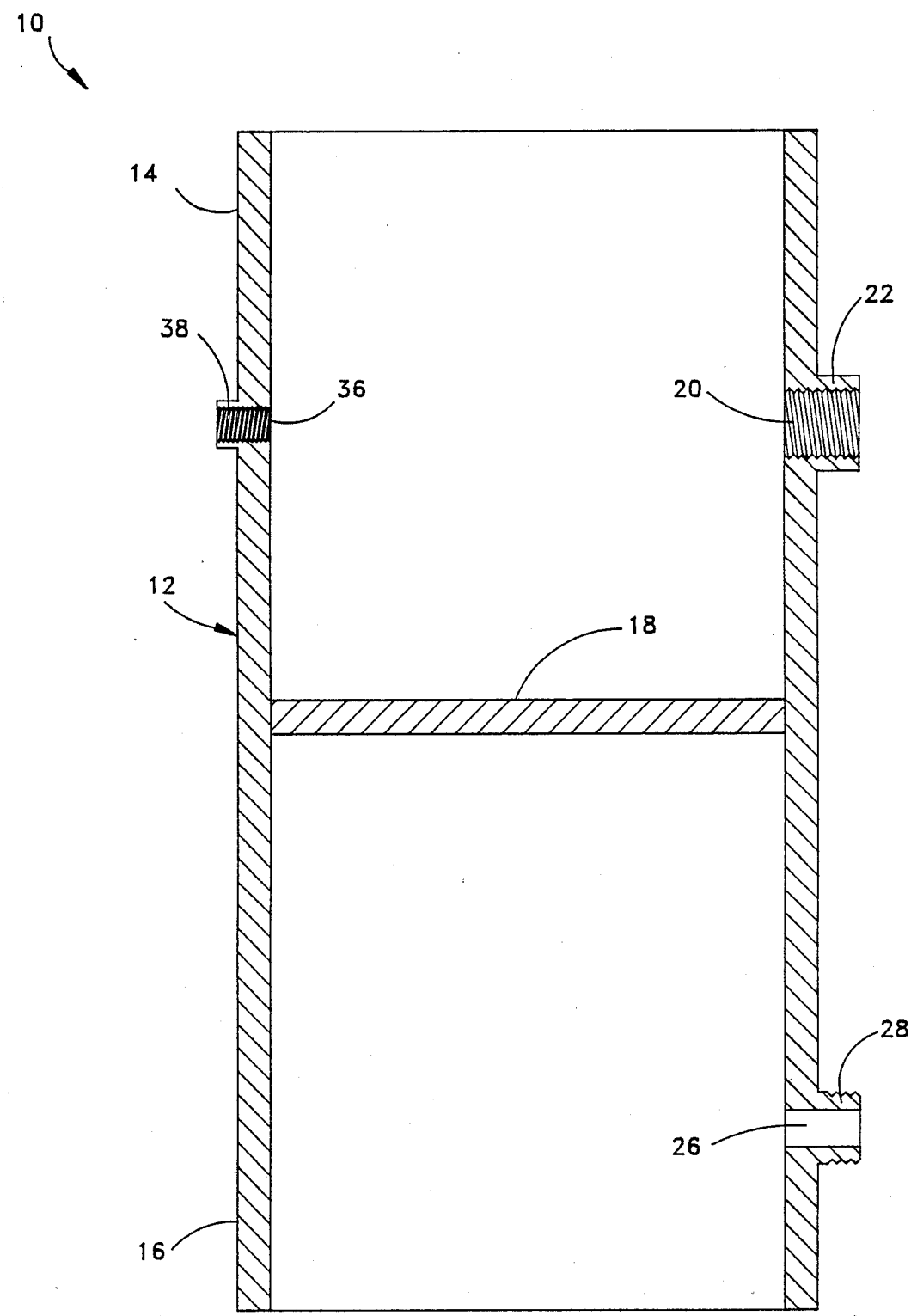
FIG. 2 is an enlarged sectional view through the test pipe.
Figure 3:
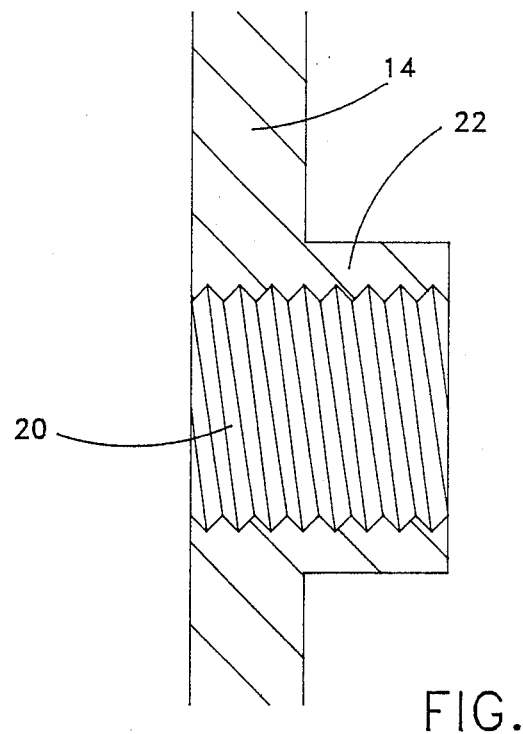
FIG. 3 is a further enlarged partial sectional view through the first port in the top end portion of the test pipe.
Figure 4:
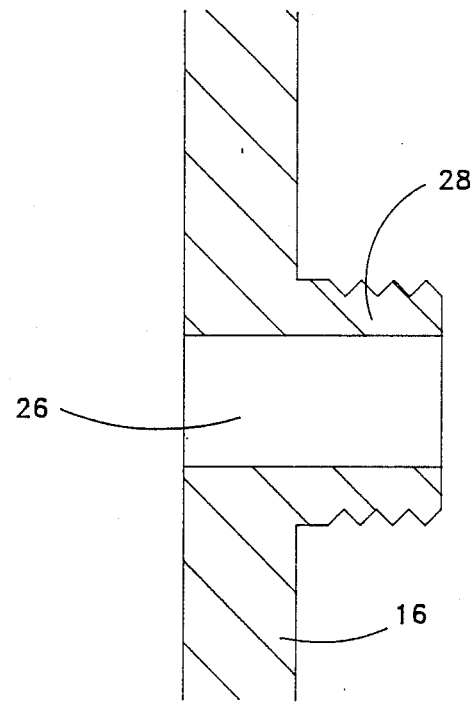
FIG. 4 is an enlarged partial sectional view through the second port in the bottom end portion of the test pipe.

The test pipe 10 of the present invention is shown in FIG. 1 as including an elongated main pipe section 12 having open ended top and bottom end portions 14 and 16. Main pipe section 12 is preferably cylindrical and thereby adapted to replace a short pipe section at the bottom of a multi-story test portion of a building piping system. The top and bottom end portions are separated by a closure plate 18 which extends across and fills the inside diameter of main pipe section 12 to prevent any fluid flow therethrough.

Fluid communication with the test portion of the piping system is established through a first port 20 through the side wall of top end portion 14. A female boss 22 surrounds the port and extends outwardly therefrom a short distance for a threaded connection to a conventional quick-disconnect coupler 24 which includes a valve that operates to prevent fluid flow through the coupler when a quick-disconnect fitting is not connected to it.

A second port 26 opens through the sidewall of the bottom end portion for draining fluid back into the piping system below the test pipe. A male threaded boss 28 surrounds second port 26 and protrudes therefrom for releasable connection to a standard female hose connection 30 of a bypass drainage hose 32 having a quick-disconnect fitting 34 on the opposite end thereof.

A third port 36 opens through the sidewall of the top end portion 14 and is surrounded by a smaller diameter female boss 38 for a threaded connection to a fluid pressure gauge 40.

Whereas, the test pipe 10 may be cast iron or aluminum, an integral molded plastic test pipe is preferred for lightweight handling and transport, economical manufacture and durability. Closure plate 18 may be integrally formed with the main pipe section 12, or may be separately inserted and affixed therein by welding or any other suitable means which affords a strong fluid-tight connection to the cylindrical sidewall of main pipe section 12.

It is expected that the test pipes will be provided in various diameters to accommodate testing of all common pipe sizes. A preferred line of test pipes will include diameters of one and a half inches (1½"), two inches (2"), three inches (3"), four inches (4"), five inches (5"), six inches (6"), eight inches (8") and ten inches (10"). The length of the test pipes will likewise vary according to the diameter, ranging preferably from approximately six and three eighths inches (6⅜") for a two inch (2") test pipe to approximately thirteen and a quarter inches (13¼") for an eight inch (8") test pipe.

The diameter of the first port 20 is selected to accommodate the type of quick-disconnect coupler 24 which is adapted to receive the quick-disconnect fitting 34 of a standard five eighths inch (⅝") rubber hose. Likewise, the diameter of second port 26 is selected to accommodate connection to a standard female hose connection 30 of a five eighths inch (⅝") rubber hose. Finally, the female boss 38 of third port 36 preferably has a quarter inch (¼") threaded opening to accommodate connection to a conventional fluid pressure gauge having a dial reading zero to approximately thirty (30) pounds.

The operation of the test pipe 10 of the invention and method for testing a piping system are described with reference to FIG. 5 which illustrates a three-story test portion 42 of a multi-story piping system 44. At the base of the test portion 42, a pipe section is removed and replaced with the test pipe 10 of the invention. The actual connection to the system is shown best by FIG. 6 wherein a rubber insert 46 is secured around each end of the test pipe 10 and the adjacent system pipe by a stainless steel corrugated band 48 which is held in place by a pair of stainless steel ring clamps 50 and 52.

Again, referring to FIG. 6, the test portion 42 of piping system 44 may be filled with water from supply hose 54 connected to a source of pressurized water. Hose 54 is equipped with a quick-disconnect fitting 34 adapted for connection to the quick-disconnect coupler 24 at first port 20. Alternatively, test portion 42 of the piping system could be closed off for air testing and a source of pressurized air could be connected to first port 20 through quick-disconnect coupler 24 or any other suitable valved connection. Since pressure testing by water is more common, the described operation will discuss water pressure testing but is not to be considered limited thereto.

The weight of the water in the filled test portion 42 of the piping system results in substantial pressure within the test pipe 10, perhaps on the order of up to thirty (30) pounds for a three (3) to five (5) story test portion. That pressure is immediately readable on gauge 40. Any leaks in the system will result in a lowering of the height of the water column in the test port and a consequent reduction in pressure at test pipe 10, which reduction is detectable by monitoring pressure gauge 40. If a lowering of pressure occurs, the test portion needs to be drained to a height below the leak so that the leak can be repaired. Upon completion of the repair, the test portion 42 is again fully pressurized and the test gauge 40 again monitored. Upon satisfactory testing, the test portion 42 is easily drained by simply disconnecting the quick-disconnect fitting 34 of hose 50 from the quick-disconnect coupler 24 and replacing it with the quick-disconnect fitting 34 of bypass hose 32. Upon disconnection of supply hose 54, no leakage of water from the first part occurs due to the internal valve of the quick-disconnect coupler 24. Upon connection of bypass hose 32 to the quick-disconnect coupler 24, all water in the system drains from the test portion through hose 32 so as to bypass closure plate 18 for drainage into the system 44 directly below the test pipe.

Whereas the test pipe of the invention has been shown and described in connection with a preferred embodiment thereof, it is apparent that many modifications, additions, and substitutions may be made which are within the intended scope of the appended claims.

For example, the filling of the test portion may be simplified if the second port 30 is rotated ninety degrees (90°) on the test pipe. The internal construction of the test pipe is not critical to the invention so long as top and bottom end portions are connectable to the system piping and fluid flow through the test pipe is prevented. The length of the bypass hose is not critical but a hose of approximately twenty-four inches (24") is short enough for convenient use, yet long enough to prevent kinking.

Likewise, whereas the test pipe is shown for use and above ground piping system 44, it may be used underground along a horizontal pipe with the test pipe oriented so that both the first and second ports 20 and 26 are directed downward. A hole may have to be dug to accommodate access to the ports for the testing operation.

Accordingly, there has been shown and described an improved test pipe and method for pressure testing a piping system which accomplish at least all of the stated objects.

I claim:

1. A reusable test pipe for pressure testing piping systems having first and second pipe sections, said test pipe comprising, an elongated main pipe section having generally cylindrical top and bottom end portions, closure means affixed within said main pipe section for preventing fluid flow through said main pipe section between said top and bottom end portions, closure means affixed within said main pipe section for preventing fluid flow through said main pipe section between said top and bottom end portions, a first port in communication with said top end portion for filling with fluid a test portion of a piping system into which said main pipe section is installed, a second port in communication with said bottom end portion for draining fluid from said test portion of said piping system, valve means operatively associated with said first port for selectively closing and opening said first port to fluid flow therethrough, and means for establishing fluid communication between said first and second ports for draining fluid from said test portion in bypass relation to said closure means, and coupling means for removably supporting and sealing said test pipe between said first and second pipe sections so as to allow said test pipe to be removed without movement of said first and second pipe sections.

2. The test pipe of claim 1 wherein said main pipe section comprises a cylindrical pipe and said closure means comprises a plate extended across and closing the inside diameter of said pipe.

3. The test pipe of claim 2 wherein said plate is permanently affixed to said pipe.

4. The test pipe of claim 1 wherein said valve means comprises a quick-disconnect coupling adapted for releasable connection to a quick-disconnect hose fitting.

5. The test pipe of claim 1 wherein said means for establishing fluid communication between said first and second ports comprises threaded hose fittings on said first and second ports.

6. The test pipe of claim 5 wherein said threaded hose fittings include a female threaded boss in communication with said first port for connection to said valve means.

7. The test pipe of claim 6 wherein said threaded hose fittings further comprise a male threaded boss in communication with said second port for connection to a standard female hose connection.

8. A reusable test pipe for pressure testing piping systems having first and second pipe sections, said test pipe comprising, an elongated main pipe section having generally cylindrical top and bottom end portions, closure means affixed within said main pipe section for preventing fluid flow through said main pipe section between said top and bottom end portions, a first port in communication with said top end portion, a second port in communication with said bottom end portion, valve means operatively associated with said first port for selectively closing and opening said first port to fluid flow therethrough, a bypass hose having opposite ends and means for detachably connecting said opposite ends to said valve means and second port, respectively for drainage of fluid from said top end portion to said bottom end portion in bypass relation to said closure means, said hose being detachable from said valve means for connection of said valve means to a source of pressurized fluid for filling with fluid a test portion of a piping system into which said main pipe section is installed, and coupling means for removably supporting and sealing said test pipe between said first and second pipe sections so as to allow said test pipe to be removed without movement of said first and second pipe sections.

9. The test pipe of claim 8 further comprising means for coupling and sealing said top and bottom end portions into said piping system below the test portion thereof.

10. A method for pressure testing a test portion of a piping system of a multi-story building, comprising, providing a test pipe including a main pipe section having generally cylindrical top and bottom end portions, closure means for preventing fluid flow through said pipe section between said top and bottom end portions, first and second ports in communication with said top and bottom end portions respectively and valve mean operatively associated with said first port for selectively closing and opening said first port for fluid flow therethrough, providing a fluid pressure gauge and a bypass drain hose, installing said test pipe into said piping system at the bottom of said test portion, connecting said first port to a source of pressurized fluid, opening said valve means and thereby filling said test portion with fluid, monitoring said pressure gauge to detect any loss of pressure within said test portion, disconnecting the source of pressurized fluid from said first port and closing said valve means, connecting opposite ends of said drain hose to said first and second ports, and opening said valve means to drain fluid from said test portion to the portion of said piping system connected to said bottom end portion.

11. A test pipe for pressure testing piping systems, comprising, an elongated main pipe section having generally cylindrical top and bottom end portions, closure means affixed within said main pipe section for preventing fluid flow through said main pipe section between said top and bottom end portions, a first port in communication with said top end portion for filling with fluid a test portion of a piping system into which said main pipe section is installed, a second port in communication with said bottom end portion for draining fluid from said test portion of said piping system, valve means operatively associated with said first port for selectively closing and opening said first port to fluid flow therethrough, and means for establishing fluid communication between said first and second ports for draining fluid from said test portion in bypass relation to said closure means, a third port in communication with said top end port, and means for operatively connecting said third port to a pressure gauge for measuring fluid pressure within said top end portion.

12. A test pipe for pressure testing piping systems, comprising, an elongated main pipe section having generally cylindrical top and bottom end portions, closure means affixed within said main pipe section for preventing fluid flow through said main pipe section between said top and bottom end portions, a first port in communication with said top end portion for filling with fluid a test portion of a piping system into which said main pipe section is installed, a second port in communication with said bottom end portion for draining fluid from said test portion of said piping system, valve means operatively associated with said first port for selectively closing and opening said first port to fluid flow therethrough, and first port threaded hose fittings, second port threaded hose fittings, female threaded boss in communication with said first port for connection to said valve means, male threaded boss in communication with said second port for connected to a standard female hose connection, a quick-disconnect coupling threaded into said female threaded boss at said first port, and means for establishing fluid communication between said first and second ports for draining fluid from said test portion in bypass relation to said closure means.

13. The test pipe of claim 12 wherein said means for establishing fluid communication between said first and second ports further comprises a hose having a quick-disconnect fitting on one end adapted for releasable connection to said quick-disconnect coupling and a standard female hose connection on the opposite end thereof for releasable connection to the male boss at said second port, thereby to provide a bypass fluid connection between said first and second ports for drainage of fluid from the test portion of a piping system.

14. A test pipe for pressure testing piping systems, comprising, an elongated main pipe section having generally cylindrical top and bottom end portions, closure means affixed within said main pipe section for preventing fluid flow through said main pipe section between said top and bottom end portions, a first port in communication with said top end portion, a second port in communication with said bottom end portion, valve means operatively associated with said first port for selectively closing and opening said first port to fluid flow therethrough, and a bypass having opposite ends and means for detachably connecting said opposite ends to said valve means and second port, respectively for drainage of fluid from said top end portion to said bottom end portion in bypass relation to said closure means, said hose being detachable from said valve means for connection of said valve means to a source of pressurized fluid for filling with fluid a test portion of a piping system into which said main pipe section is installed, and a fluid pressure gauge operatively associated with said top end portion for measuring the presence of fluid therein.

* * * * *